Dec. 14, 1954 R. LARSEN 2,696,691
FLOATING TRAWL
Filed Nov. 28, 1949
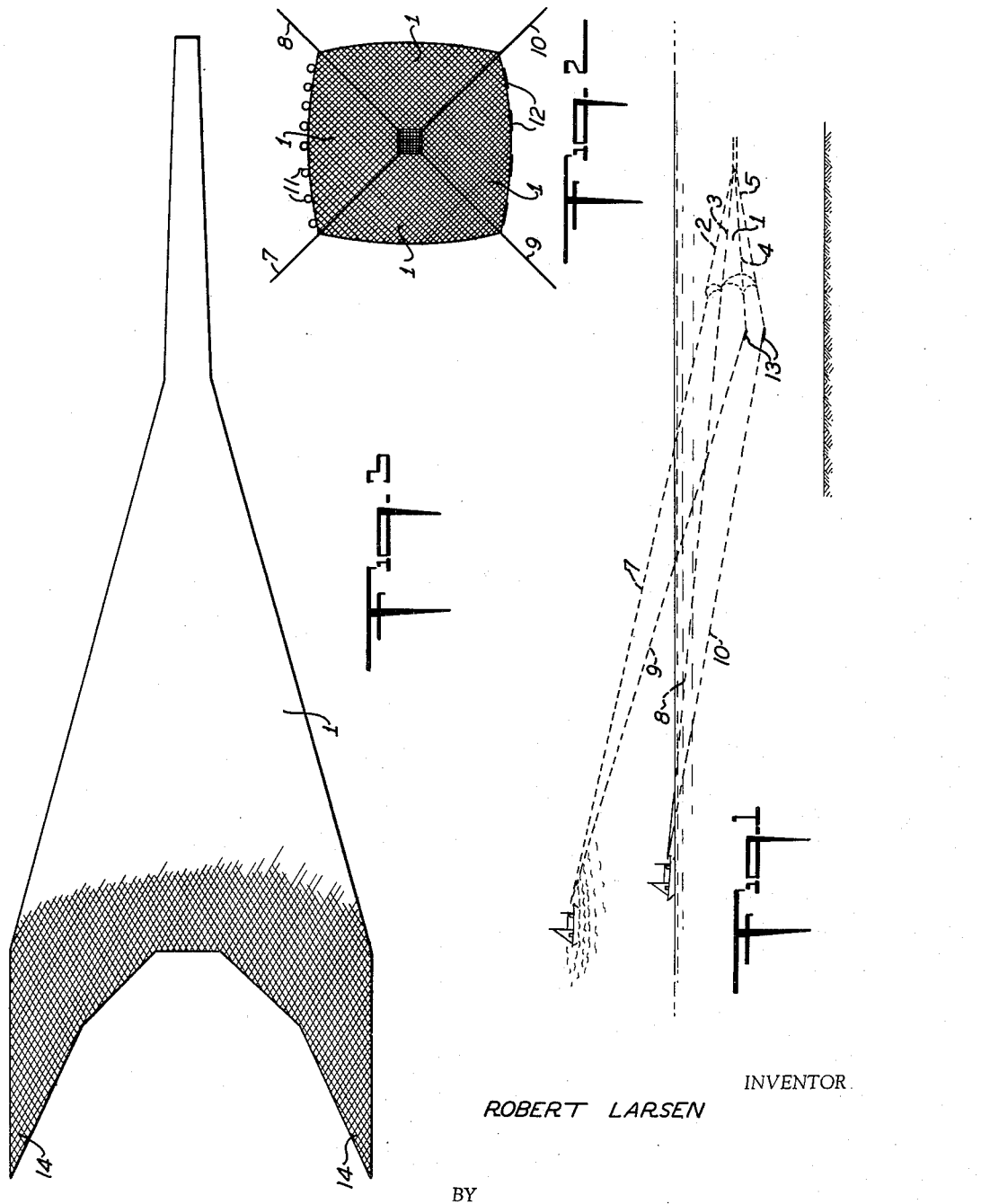
INVENTOR
ROBERT LARSEN
BY
ATTORNEYS

United States Patent Office 2,696,691
Patented Dec. 14, 1954

2,696,691

FLOATING TRAWL

Robert Larsen, Skagen, Denmark

Application November 28, 1949, Serial No. 129,830

Claims priority, application Denmark December 1, 1948

3 Claims. (Cl. 43—9)

This invention relates to a floating trawl, by which term should here be understood a fishing implement the principal part of which is a trawl-like net bag arranged for being towed horizontally through the water at any desired level below the surface of the sea.

Various proposals are known for such fishing implements, which proposals are substantially based on the idea to provide trawl nets of the ordinary bottom trawls type with different devices to enable them to be towed freely through the water. None of these proposals did, however, lead to practically applicable fishing implements showing hauls worth mentioning, and in accordance with the cognition on which the present invention is based these poor results are due in part to the fact that the passage of the trawl net through the water was not sufficiently steady, in part to the fact that the guiding devices were too complicated and created too much disturbance, thereby scaring the fish away from the mouth of the trawl net.

The purpose of the invention is to provide such a design of the trawl net and its towing gear that the net can be drawn steadily forwards through the water at any optional level with its mouth widely distended and guided solely by the pull in the tow ropes.

The present floating trawl is of the kind intended for being towed after two vessels moving parallel to each other and, by keeping a suitable distance between each other, keeping the mouth of the trawl distended laterally, and in which the trawl consists of substantially congruent top and bottom net sections which are provided with approximately parabolic or rather catenarian front edges and along their side edges are united with side net sections, a tow rope leading from the front end of each of the four arms thus produced. The characteristic feature of the invention is that the side sections are of a similar shape as the top and bottom sections, their front edges being likewise approximately catenarian, and are of a comparatively considerable height, so that during towing with its net sections tightly distended the trawl has a forwards-facing mouth of so great a height in relation to its width that also in the vertical direction a substantially steady advance through the water is attained, while the tow ropes leading from the lower trawl arms are so loaded during the operation that their pull in the trawl arms is directed obliquely downwards so as to be substantially symmetrical with the pull from the upper tow ropes with regard to a horizontal middle plane through the mouth.

Experiments have proved that it is of decisive importance for the vertical stability of a floating trawl that the mouth has a comparatively considerable height in relation to its width as different from the very wide and low mouths of the usual bottom trawls, and that all of the net surfaces are beforehand shaped approximately in accordance with the catenary curve which their front edges will tend to form during the towing, whereby the net surfaces are held tightly adjacent the mouth and vibrations are avoided, and finally it has proved that a steady travel at a desired level can be attained if care is taken that the resultant of the pulls exerted by the towlines in the arms of the net bag wholly or approximately falls in a horizontal middle plane through the mouth. The latter can, as mentioned before, be attained by the lower tow ropes only being given such a weight that the pull exerted by them will be directed obliquely downwards symmetrical with the obliquely upwards-directed pull of the upper tow ropes with regard to the horizontal plane through the middle of the mouth.

By virtue of said combination of characteristics it has proved possible without the application of floats travelling at the surface or other special depth control arrangements to tow the present floating trawl with widely opened mouth at a constant desired level without the occurrence of vibrations or other disturbances which might scare the fish away. The present floating trawl with pertaining towing means is exceedingly simple and easy to operate and contains no complicated adjustable elements liable to get in disorder.

The fact that floats at higher levels or at the surface have been dispensed with entails that the present floating trawl can without difficulty be used in a heavy sea as the wave motions of the water do not extend down to the depths at which the fish shoals are to be found and at which the trawl should consequently be towed, while the influence of the seas on the tow ropes is insignificant.

The angular position of the tow ropes will during towing at constant velocity be practically speaking independent of the depth, which can therefore be regulated simply by more or less rope being payed out from the towing vessels.

In an expedient embodiment of the invention the side sections of the trawl net are congruent with the top and bottom sections so that the mouth becomes wholly or approximately square, resulting in a high catching capacity and a good stability.

The obliquely downwards-directed pull which the lower tow ropes are to exert in the trawl net may in accordance with the invention advantageously be obtained by loading bodies e. g. in the form of pieces of iron chain or hooked-on changeable weights being mounted only in or on the lower tow ropes at a comparatively large distance— e. g. at least one-third of the length of the trawl net—in front of the mouth.

The invention is illustrated on the drawing by a diagrammatically shown embodiment, Fig. 1 shows a trawl in accordance with the invention in side elevation in its operating position, Fig. 2 is a front view of the trawl shown in Fig. 1, and Fig. 3 is a diagrammatic side view of the net on a larger scale.

In the embodiment shown the floating trawl consists of a net bag 1 composed of four congruent sections of fishing net of the form shown diagrammatically in Fig. 3. The four net sections are assembled on edge ropes, 2, 3, 4, and 5, respectively, and shaped so that when stretched out in a plane they have a substantially catenarian front edge as shown in Fig. 1 whereby local strains of the net in the vicinity of the mouth and vibrations of the net surfaces adjacent the mouth are avoided.

The edge ropes 2, 3, 4, and 5 are at the front ends of the four forwardly directed portions of the net bag thus formed secured to or continued into tow ropes, 7, 8, 9, and 10, respectively, which are pairwise secured each to its vessel of two towing vessels moving parallel to each other, which vessels by keeping a suitable distance between each other keep the mouth of the net bag opened horizontally.

The distention of the mouth of the net bag in the vertical direction is likewise effected substantially by the pull in the tow ropes, the two upper tow ropes 7 and 8 exerting an obliquely upwards-directed pull, while the two lower tow ropes 9 and 10 are at a suitable distance in front of the mouth of the net bag provided with a load 13 which forces these tow ropes so much down that their pull in the net bag becomes obliquely downwardly directed so as to be substantially symmetrical with the obliquely upwardly directed pull of the tow ropes 7 and 8 with regard to a horizontal middle plane through the mouth of the net bag.

By this arrangement and by the considerable extent in the vertical direction of the mouth of the net bag and finally by the design of all of the four net sections with substantially catenarian front edges it is possible to tow the net bag smoothly and steadily through the water at a constant level and with its mouth tightly distended with the slightest possible resistance and disturbance.

For the facilitation of the manoeuvring of the net bag during the launching of the trawl there are in the embodiment referred to, as shown in Fig. 2, along the front edge of the top net section mounted floats 11, in the form of the usual glass-balls, while along the front edge of the bottom net section weight loads 12, in the form of lead weights, are mounted.

During operation at constant velocity the tow ropes take up a practically speaking unaltered oblique position in the water irrespective of the depth, and the level at which the net bag is to be towed can therefore be adjusted at wish by more or less tow rope being payed out from the towing vessels. The trawl can therefore be towed at the exact level at which it should be most probable to find shoals of fish, which may in advance have been localized by echo sounding.

The load on the lower tow ropes 9 and 10 may as shown in Fig. 1 be effected by the latter being for a larger or smaller part of their length heavier than the upper tow ropes. There may e. g. in or on the lower tow ropes be inserted a piece of iron chain, but it is more practical, however, to hook on changeable loading bodies, e. g. lead weights.

Referring to Fig. 3 of the drawing that figure shows a diagrammatic side view of a net bag 1 of approximate square section with identical side pieces each with a projecting arm or portion 14 at each leading corner of its mouth. Each portion 14 is a substantially triangular piece of netting which together with its adjacent portion forms a projecting forward corner of the net bag mouth to which a tow line is connected. The net bag may be made by suitably uniting the four net pieces along their longitudinal edges.

I claim:

1. A trawling gear comprising a trawl net bag having similarly formed top, bottom and side net sections united along their lateral edges and provided with approximately catenarian front edges so as to form, in outstretched operational condition, a substantially rectangular bag mouth of a height of the same order of magnitude as the width thereof and having at each mouth corner a protruding portion formed by two adjacent sections, a tow line for the forward end of each of said portions, means for attaching a pair of tow lines for each side of the trawl net bag to a separate towing vessel, and loading means for the lower tow lines only at a distance before the mouth of the net bag and adjusted to keep the sections of the lower tow lines between said loading means and said mouth in an oblique, diverging position substantially symmetrical with the oblique diverging position of the corresponding sections of the upper tow lines with respect to a horizontal plane through the middle of said mouth.

2. A trawling gear comprising a trawl net bag having substantially uniform top, bottom and side net sections united along their lateral edges and provided with approximately catenarian front edges so as to form, in outstretched operational condition, a substantially square bag mouth having at each corner a protruding portion formed by two adjacent sections, a tow line for the forward end of each of said portions, means for attaching a pair of tow lines for each side of the trawl net bag to a separate towing vessel, and loading means for the lower tow lines only at a distance before the mouth of the net bag and adjusted to keep the sections of the lower tow lines between said loading means and said mouth in an oblique, diverging position substantially symmetrical with the oblique diverging position of the corresponding sections of the upper tow lines with respect to a horizontal plane through the middle of said mouth.

3. A trawling gear according to claim 1, in which the loading means for the lower tow lines are positioned at least one-third of the length of the trawl net bag before the mouth of said bag.

References Cited in the file of this patent

UNITED STATES PATENTS

| Number | Name | Date |
| --- | --- | --- |
| 1,485,338 | Skrmetti | Feb. 26, 1924 |
| 2,137,663 | Aspenburg | Nov. 22, 1938 |

FOREIGN PATENTS

| Number | Country | Date |
| --- | --- | --- |
| 20,323 | Great Britain | 1894 |
| 25,603 | Sweden | Oct. 3, 1908 |
| 37,282 | Norway | July 2, 1923 |
| 264,138 | Great Britain | Mar. 6, 1928 |
| 298,218 | Great Britain | Mar. 7, 1929 |
| 353,670 | Great Britain | July 30, 1931 |
| 2,598,097 | Great Britain | Feb. 10, 1948 |